United States Patent [19]

Fischer

[11] Patent Number: 5,092,717
[45] Date of Patent: * Mar. 3, 1992

[54] DEVICE FOR MAKING A DRILLED HOLE WITH AN UNDERCUT

[75] Inventor: Artur Fischer, Waldachtal, Fed. Rep. of Germany

[73] Assignee: fischerwerke Artur Fischer GmbH & Co. KG, Tumlingen, Fed. Rep. of Germany

[ * ] Notice: The portion of the term of this patent subsequent to Feb. 19, 2008 has been disclaimed.

[21] Appl. No.: 674,068

[22] Filed: Mar. 21, 1991

[30] Foreign Application Priority Data

May 4, 1990 [DE] Fed. Rep. of Germany ....... 4014224

[51] Int. Cl.⁵ .......................................... B23B 51/06
[52] U.S. Cl. ........................................ 408/59; 175/214; 408/72 R; 408/202; 408/226; 408/241.5
[58] Field of Search .................. 408/192, 202, 241 B, 408/241 S, 72 R, 72 B, 113, 226, 57–60; 175/220, 214, 215; 285/190; 409/136

[56] References Cited

U.S. PATENT DOCUMENTS

| | | |
|---|---|---|
| 3,259,403 | 7/1966 | Hjalsten et al. ............... 175/215 X |
| 3,555,937 | 1/1971 | Nicodemas ...................... 408/59 |
| 4,585,256 | 4/1986 | Rassieur et al. .............. 175/214 X |
| 4,962,820 | 10/1990 | Fischer ....................... 408/72 R X |
| 4,993,894 | 2/1991 | Fischer et al. .................. 408/202 X |

*Primary Examiner*—Steven C. Bishop
*Attorney, Agent, or Firm*—Michael J. Striker

[57] ABSTRACT

The device for producing a drilled hole with an undercut includes a drilling tool having a shank and a drilling head faced with a plurality of diamond chips, a drilling tool-holder structured to hold the drilling tool and a rotatable sleeve having an axial throughgoing passage for the drilling tool and the drilling tool-holder and also having a lateral connecting pipe for a cooling and flushing liquid. So that the drilled hole with the undercut can be made in a single working step using the same drilling tool, the shank of the drilling tool (2) is provided with a stop collar (12) and also a cross-sectionally enlarged portion (17). The shank of the drilling tool (2) tapers uniformly toward the drilling head (11) and also tapers uniformly toward the stop collar (12). The shank is provided with a plurality of longitudinally extending helical grooves at least in the vicinity of the enlarged portion so that the enlarged portion can act together with the wall of the drilled hole as a pivot during formation of the undercut.

7 Claims, 1 Drawing Sheet

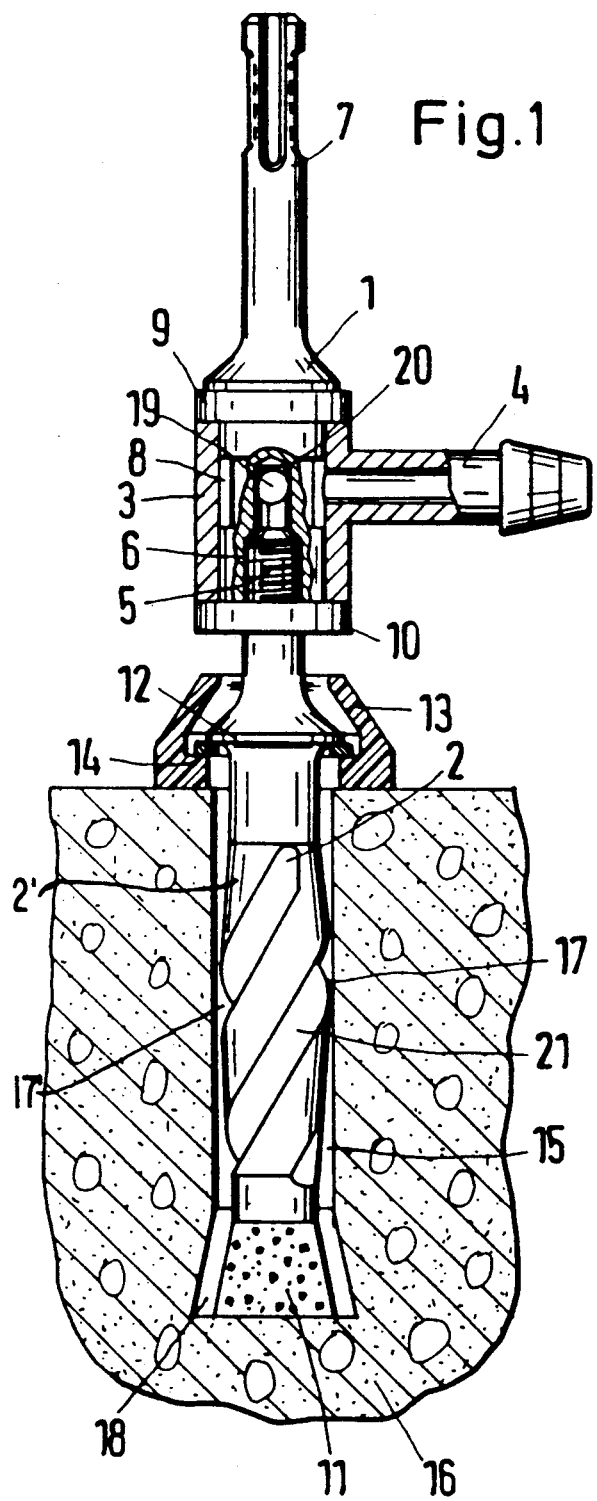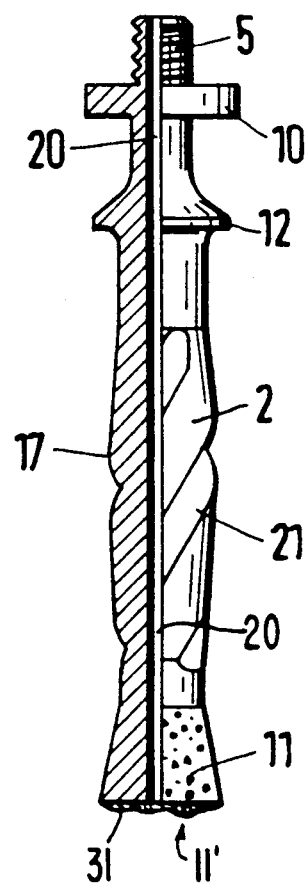

DEVICE FOR MAKING A DRILLED HOLE WITH AN UNDERCUT

BACKGROUND OF THE INVENTION

The invention relates to a device for producing a drilled hole with an undercut.

Devices for producing drilled holes with undercuts are known. In one such device a drilling tool-holder is engaged in and provided with a rotatable sleeve with a connecting pipe for supplying cooling and flushing liquid and a drilling tool is held in the drilling tool-holder. The drilling tool has a drilling head faced with diamond chips and the sleeve has an axial throughgoing bore in which the drilling tool-holder engage the drilling tool.

To produce an undercut in a drilled hole, a drill with a hard metal drill bit that has lateral cutting edges projecting at the drilling head can be used. The undercut is produced by pivoting the drilling tool, once the cylindrical part of the drilled hole has been made, and in this position performing one or more stirring movements with the drilling machine. In the bottom part of the drilled hole, the drilling head reams out an undercut into which an expansible plug with an expansible sleeve which fits the undercut can be inserted and installed. To facilitate the pivoting movement of the drilling tool, the drilling tool is provided with a fixed stop collar, which, to form a pivot bearing, is supported in a depression of a stop plate positioned on the concrete surface.

In high-strength concrete, and especially in reinforced concrete, because of the high wear rate and risk of breakage, a drilling tool with a hard metal bit is not very suitable for producing drilled holes. It is therefore usual to use diamond-faced bits on such building materials to drill holes. A drilled hole with an undercut is then produced in two steps. In the first step, the cylindrical drilled hole is made with a diamond crown bit and the drilled core remaining after drilling is broken away. The undercut is then produced with a reaming apparatus. Because the core does not always break off right at the depth that the crown bit has reached, to avoid damaging the reaming apparatus the undercut is made at a distance from the bottom of the drilled hole. In addition to two working steps to produce the drilled hole with an undercut, a cylindrical drill hole that is deeper than would actually be required for anchoring the fixing element is also always necessary.

SUMMARY OF THE INVENTION

It is therefore an object of the invention to provide a device of the above-described kind with which it is possible to produce a drilled hole with an undercut in a single working step using a diamond-faced or otherwise tipped drilling tool.

According to the invention, the shank of the drilling tool is provided with a stop collar and a cross-sectionally enlarged portion between the stop collar and the drilling head. The enlarged portion has a diameter corresponding approximately to a diameter of the drilling head. Furthermore, the shank of the drilling tool tapers, advantageously uniformly, from the enlarged portion to the stop collar and also from the enlarged portion to the drilling head. On the outer surface of the shank a plurality of longitudinally-extending grooves are provided.

In operation, water is admitted as a cooling and flushing liquid through the axial continuous bore of the drilling tool to the drill bit tip or drilling head through the connecting pipe on the sleeve. The water flows from the drill hole via the grooves arranged on the shank surface. The diamond-faced drilling tool is cooled by the continuous supply of water and, at the same time, the drilling dust is flushed out of the drilled hole.

Once the cylindrical part of the drilled hole has been made and the desired drilled hole depth has been reached, the stop collar arranged on the drilling tool comes into engagement with the outer face of the concrete. In this position, the drilling tool is pivoted with the drilling machine and one or more stirring movements are performed. In conjunction with the wall of the drilled hole, the cross-sectionally enlarged portion of the drill shank forms the pivot bearing member. The required undercut is achieved, when the taper starting from each side of the cross-sectionally enlarged portion comes into engagement with the wall of the drilled hole. Even as the cylindrical part of the drilled hole is being made, the cross-sectionally enlarged portion serves to guide the drilling tool, so that a commercially available hand drilling machine without an arresting device can be used.

When the grooves on the shank are helical, the rotation of the drilling tool assists flushing of the drilling dust from the drilled hole.

To avoid the break off of the lip on the mouth of the drilled hole during the pivoting-out movement and to make the device even more resistant to wear, an axially fixed plastics bell can be placed over the stop collar.

To make a V-shaped undercut matching the V-shaped expansion of the fixing element to be inserted into the drilled hole, the drilling head may have a shape widening conically towards its front end.

A simple structure for the device is attained, when the sleeve is mounted between the respective flanges of the drilling tool-holder and the drill shank, and also when, at its end lying opposite the drilling head, the drilling tool has a threaded portion, which is screwed into a corresponding internal thread of the drilling tool-holder.

BRIEF DESCRIPTION OF THE DRAWING

The objects, features and advantages of the present invention will now be illustrated in more detail by the following detailed description, reference being made to the accompanying drawing in which:

FIG. 1 is a partially longitudinal cross-sectional, partially side elevational view of a drilling device for drilling a hole with an undercut according to the present invention, and FIG. 2 is a partially longitudinal cross-sectional, partially side view of a drilling tool from the drilling device shown in FIG. 1.

DETAILED DESCRIPTION OF THE INVENTION

The drilling device illustrated in FIG. 1 consists of a drilling tool-holder 1, a drilling tool 2 and a sleeve 3 engaging the drilling tool-holder. The sleeve 3 is equipped with a lateral connecting pipe 4 for supplying a cooling and flushing liquid. The drilling tool 2 has a threaded portion 5 with which it is screwed into a corresponding internal thread 6 of the drilling tool-holder 1. The drilling tool-holder 1 is also provided with a fixing shank 7, with which the holder 1 can be clamped in an unshown drill chuck of an unshown drilling machine. Furthermore, the drilling tool-holder 1 has a circumferential groove 8, over which the sleeve 3 sits, the sleeve being mounted rotatably between the flange 9 of the drilling tool-holder 1 and the flange 10 of the drilling tool 2.

At its leading end, the drilling tool 2 screwed into the drilling tool-holder 1 has a drilling head 11, which has a shape widening conically towards its front end 11' and is faced with diamond chips 31. At its rear region, on the end opposite the front end 11', the drilling tool 2 is provided with a stop collar 12, over which additionally a plastics bell 13 is engaged. This plastics bell 13 bears against the stop collar 12 through a washer 14 and thus forms a stop for limiting the depth of the drilled hole.

To produce the cylindrical portion of the drilled hole 15 in the concrete 16, the front face of the drilling head 11 is also provided with diamond chips 31. The drilling head 11 is advantageously widened toward its front 11' so that it can form the undercut 18. Once the drilled hole depth limited by the plastics bell 13 has been reached, the device is pivoted out with the drilling machine and, in doing so, one or more stirring movements are performed with the drilling machine. To allow the pivoting-out, the cross-sectionally enlarged portion 17 of the drilling shank 2' forms a pivot bearing with the wall 17' of the drilled hole. Because of the uniform taper starting from the cross-sectional enlarged portion 17 towards the drilling head 11 and also the stop collar 12, the pivot angle is limited, and this allows the undercut 18 to be reamed out exactly and identically in all drilled holes.

Both for the drilling operation and for the operation of reaming out the undercut, water is admitted through the connecting pipe 4 of the sleeve 3 to cool the drilling head and to flush out the drilling dust. The water reaches the drilling head 11 and the bottom of the drilled hole through the transverse bore 19 of the drilling tool-holder 1 and the continuous bore 20 of the drilling tool and the drilling tool-holder opening into the transverse bore 19. The water flows out of the drilled hole 15 through the helical grooves 21 on the shank.

It will be understood that each of the elements described above, or two or more together, may also find a useful application in other types of constructions differing from the types described above.

While the invention has been illustrated and described and embodied in a device for making a drilled hole with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is new and desired to be protected by Letters Patent is set forth in the appended claims.

We claim:

1. In a device for producing a drilled hole with an undercut, comprising a drilling tool having a shank and a drilling head faced with a plurality of diamond chips, said drilling tool having an axial continuous bore therethrough, a drilling tool-holder structured to hold the drilling tool and a rotatable sleeve arranged on the drilling tool-holder and provided with a connecting opening for a cooling and flushing liquid, said continuous bore communicating with said sleeve so that portions of said cooling and flushing liquid introduced into said sleeve through said connecting opening can flow down toward said drilling head through said continuous bore, the improvement wherein the shank (2') of the drilling tool (2) is provided with a stop collar (12) for arresting motion of the drilling tool and also a cross-sectionally enlarged portion (17) located between the drilling head (11) and the stop collar (12), the shank of the drilling tool (2) tapering toward the drilling head (11) from the enlarged portion (17) and also tapering toward the stop collar (12) from the enlarged portion (17), and wherein the shank is provided with a plurality of longitudinally extending grooves (21) at least in the vicinity of the enlarged portion (17), the enlarged portion having a diameter approximately equal to a diameter of the drilling head.

2. The improvement as defined in claim 1, wherein the grooves (21) in the shank are helical.

3. The improvement as defined in claim 1, further comprising an axially fixed plastics bell (13) engaged over the stop collar (12).

4. The improvement as defined in claim 1, wherein the drilling head (11) has a front end (11') and widens conically towards the front end.

5. The improvement as defined in claim 1, wherein the drilling tool-holder has a flange (9) and the shank has another flange (10) and the rotatable sleeve (3) is mounted rotatably between the flanges (9,10).

6. The improvement as defined in claim 1, wherein the drilling tool (2) has a threaded portion (5) and the drilling tool-holder (1) has a corresponding internal thread (6), and the drilling tool (2) is held in the drilling tool-holder (1) by engaging the threaded portion (5) of the drilling tool (2) in the internal thread (6) of the drilling tool-holder (1).

7. The improvement as defined in claim 1, wherein the shank of the drilling tool tapers uniformly from the enlarged portion toward the drilling head and uniformly from the enlarged portion toward the stop collar.

* * * * *